(12) United States Patent  
Dec et al.

(10) Patent No.: US 8,065,727 B2
(45) Date of Patent: Nov. 22, 2011

(54) MONITORING NETWORK SERVICE AFFECTING EVENTS, TAKING ACTION, AND AUTOMATING SUBSCRIBER NOTIFICATION

(75) Inventors: Wojciech Dec, Amsterdam (NL); Vincent J. Mammoliti, Mississauga (CA); Richard M. Pruss, Tewantin (AU); Murtaza Chiba, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1104 days.

(21) Appl. No.: 11/772,342

(22) Filed: Jul. 2, 2007

(65) Prior Publication Data

US 2009/0013383 A1 Jan. 8, 2009

(51) Int. Cl.
 *G06F 11/00* (2006.01)
(52) U.S. Cl. ............................................. 726/22; 726/23
(58) Field of Classification Search ............... 726/11–15, 726/22–30; 709/223–225, 228–229; 713/150–155
See application file for complete search history.

(56) References Cited

U.S. PATENT DOCUMENTS

| | | | |
|---|---|---|---|
| 6,298,445 B1 * | 10/2001 | Shostack et al. | 726/25 |
| 6,519,571 B1 * | 2/2003 | Guheen et al. | 705/14.66 |
| 6,754,181 B1 | 6/2004 | Elliott et al. | |
| 6,829,221 B1 | 12/2004 | Winckles et al. | |
| 7,092,707 B2 | 8/2006 | Lau et al. | |
| 7,584,298 B2 * | 9/2009 | Klinker et al. | 709/238 |

* cited by examiner

*Primary Examiner* — Hosuk Song
(74) *Attorney, Agent, or Firm* — P. Su

(57) ABSTRACT

In one embodiment, a method includes identifying at least one parameter as being associated with a service provided to an entity, as for example a subscriber. The service is arranged to service the entity. The method also includes monitoring the parameter to determine if accessibility to the service by the entity is compromised, and invoking a notification mechanism to send a notification to the entity if it is determined that the accessibility to the service by the entity is compromised. The notification indicates that the accessibility to the service is compromised.

21 Claims, 6 Drawing Sheets

US 8,065,727 B2

MONITORING NETWORK SERVICE AFFECTING EVENTS, TAKING ACTION, AND AUTOMATING SUBSCRIBER NOTIFICATION

BACKGROUND OF THE INVENTION

Service providers are generally unable to efficiently notify subscribers about issues within a network that may impact service. By way of example, when a border gateway protocol (BGP) gateway to the Internet becomes unavailable, subscribers who access the Internet via the BGP gateway may no longer be able to access the Internet. Although some service providers may post a notice on a website to explain a planned outage of a network control protocol such as the BGP gateway, many service providers do not post notices. In addition, notices are typically not posted in the event of an unplanned outage of a network control device that may have a bearing on a service rendered to a subscriber. Further, even if a notice is posted on a website, a subscriber may not necessarily be able to interpret the notice regarding an outage, e.g., because the subscriber does not realize that the particular outage impacts them.

The inability to access the Internet when a network device which offers connectivity service, such as a BGP gateway, becomes unavailable may lead to subscriber dissatisfaction, as for example because of a violation of a service level agreement (SLA). Further, in some instances, subscribers who are not aware of an outage that affects them may overburden servers on a common radius authentication dial in user service (RADIUS) server system by connecting and reconnecting point-to-point protocol (PPP) sessions in attempts to reach the Internet. Overburdening servers may lead to a denial of access to the Internet for subscribers who are not directly impacted by the lack of availability of the network control device which offers connectivity service. In addition, when a network control protocol becomes unavailable, there may be an increased load on the call or support center of a service provider.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes identifying at least one parameter as being associated with a service provided to an entity, as for example a subscriber. The service is arranged to service the entity. The method also includes monitoring the parameter to determine if accessibility to the service by the entity is compromised, and invoking a notification mechanism to send a notification to the entity if it is determined that the accessibility to the service by the entity is compromised. The notification indicates that the accessibility to the service is compromised.

Description

Providing a network element such as a network control device that offers connectivity service, e.g., a border gateway protocol (BGP) gateway, with the ability to notify subscribers when the subscribers are unlikely to be able to access the Internet increases the efficiency with which an overall network may operate, e.g., by preventing the overburdening of servers on a common radius authentication dial in user service (RADIUS) server system due to repeated connecting and reconnecting of point-to-point protocol (PPP) sessions in failed attempts to access the Internet. The satisfaction of subscribers with their service providers may also be increased if the subscribers are notified of at least a potential inability to access the Internet, as for example because the subscribers are less likely to be compelled to call customer service or because subscribers may be better able to obtain accurate service accounting and billing from service providers. In addition, allowing a network element to provide notification when part of a network is effectively about to become inaccessible enables the knowledge regarding the inaccessibility to be readily decimated.

A network element may monitor or observe the ability of a network, as for example a service provider network, to deliver a service by effectively observing parameters associated with the service, and determining whether the parameters indicate that the service has become unavailable. If the service is determined to have become unavailable, subscribers that utilize the service may be notified or otherwise alerted by the network element. Alternatively, the network element may trigger an application server to relay a notification to the subscribers. Yet another alternative may be for the network element to alter the transmission path of the subscriber data traffic for a particular application by having it arrive at the application server providing the alert.

Figure 1A:
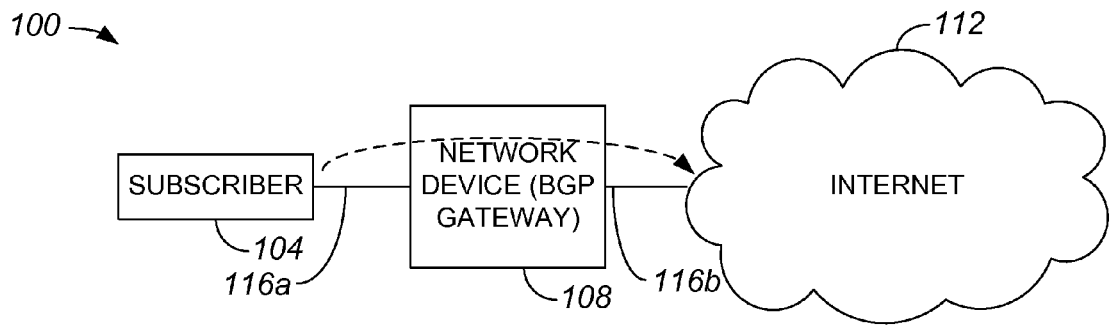
FIG. 1A is block diagram representation of a network in which a subscriber may access Internet elements, applications, and services.

A notification or alert may be sent substantially directly to a subscriber by a network element, e.g., a BGP gateway, when the network element determines that the subscriber is unlikely to access elements, applications, and/or services such as those provided on the Internet. In general, however, a gateway may utilize either an embedded or standalone application server to send a message to a subscriber. It should be appreciated that a BGP gateway is just one example of a suitable network device which offers connectivity service in accordance with the present invention. Hence, although a BGP gateway is generally described for purposes of illustration, the present invention is not limited to being implemented with respect to a BGP gateway. Further, the term "BGP gateway" may generally refer to edge routers with BGP peers. It should be understood that although a BGP gateway is described, it should be appreciated that the present invention applies to subscriber gateways, routers, and the like. FIG. 1A is block diagram representation of a network in which a subscriber may access Internet elements, applications, and services. An overall network 100 includes a subscriber 104 that has access to Internet 112 through a network element 108 such as a BGP gateway. It should be appreciated that network element 108 may generally be any suitable device or system that aggregates subscriber traffic, as for example a router, and enables subscriber 104 to access internet 112 or any other network. Subscriber 104 may access Internet 112 by communicating via links 116a, 116b and network element 108. In general, links 116a, 116b may either be wired or wireless.

Figure 1B:
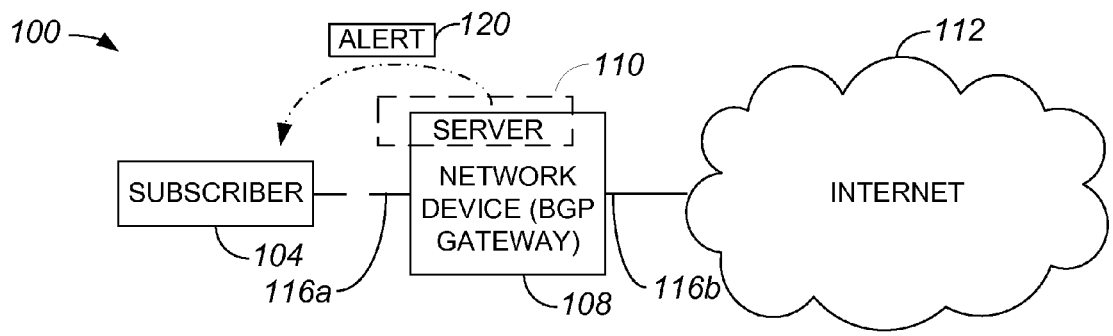
FIG. 1B is a block diagram representation of a network, e.g., network 100 of FIG. 1A, in which a subscriber receives a notification regarding the status of access to an Internet element, application, or service from a server substantially embedded in a network element in accordance with an embodiment of the present invention.

Network element 108 effectively monitors the ability of subscriber 104 to access elements, applications, and services on Internet 112, as well as to network element 108. As shown in FIG. 1B, when network element 108 determines that subscriber 104 is unable to access Internet 112, e.g., that access to Internet 112 is compromised, network element 108 may cause an alert 120 to be sent to subscriber 104 which indicates that access to Internet 112 is not available. In one embodiment, alert 120 may indicate a particular element, application, or service on Internet 112 that is likely not reachable by subscriber 104, even if other elements, applications, or services on Internet 112 remain reachable. Alert 120 may be sent by server 110.

Figure 1C:
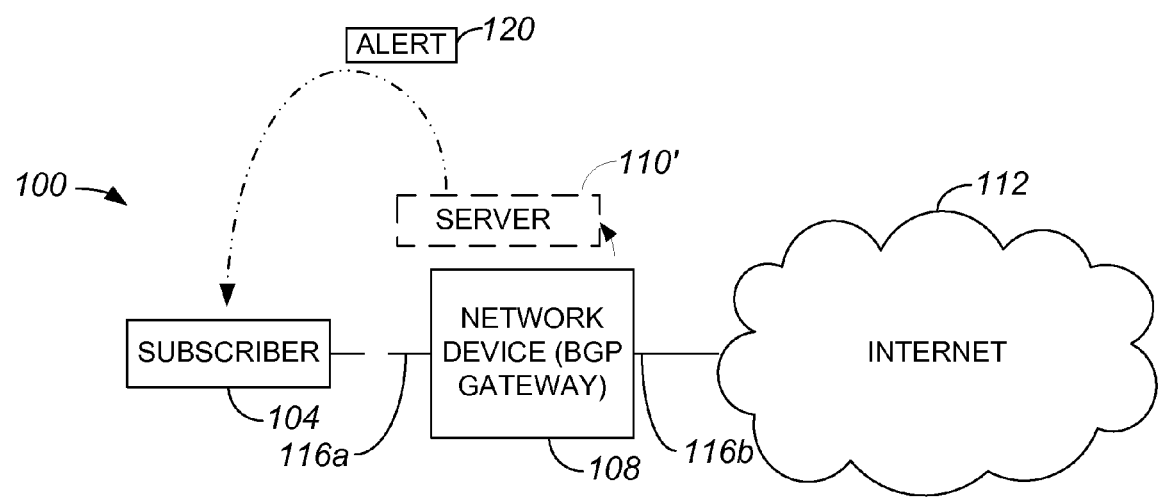
FIG. 1C is a block diagram representation of a network, e.g., network 100 of FIG. 1A, in which a subscriber receives a notification regarding the status of access to an Internet element, application, or service from a substantially standalone server that is in communication with a network element in accordance with an embodiment of the present invention.

Server 110 may be a web server that displays an alert page, or may be a server that is substantially embedded in network element 108. Server 110 may be arranged to display a notification page when a default HTTP request is sent by subscriber 104. As shown in FIG. 1C, in lieu of server 110 being substantially embedded in network element 108, a server 110' may instead be a substantially standalone server component. Server 110 may receive information from network element 108 that indicates that alert 120 should be sent.

Figure 2:
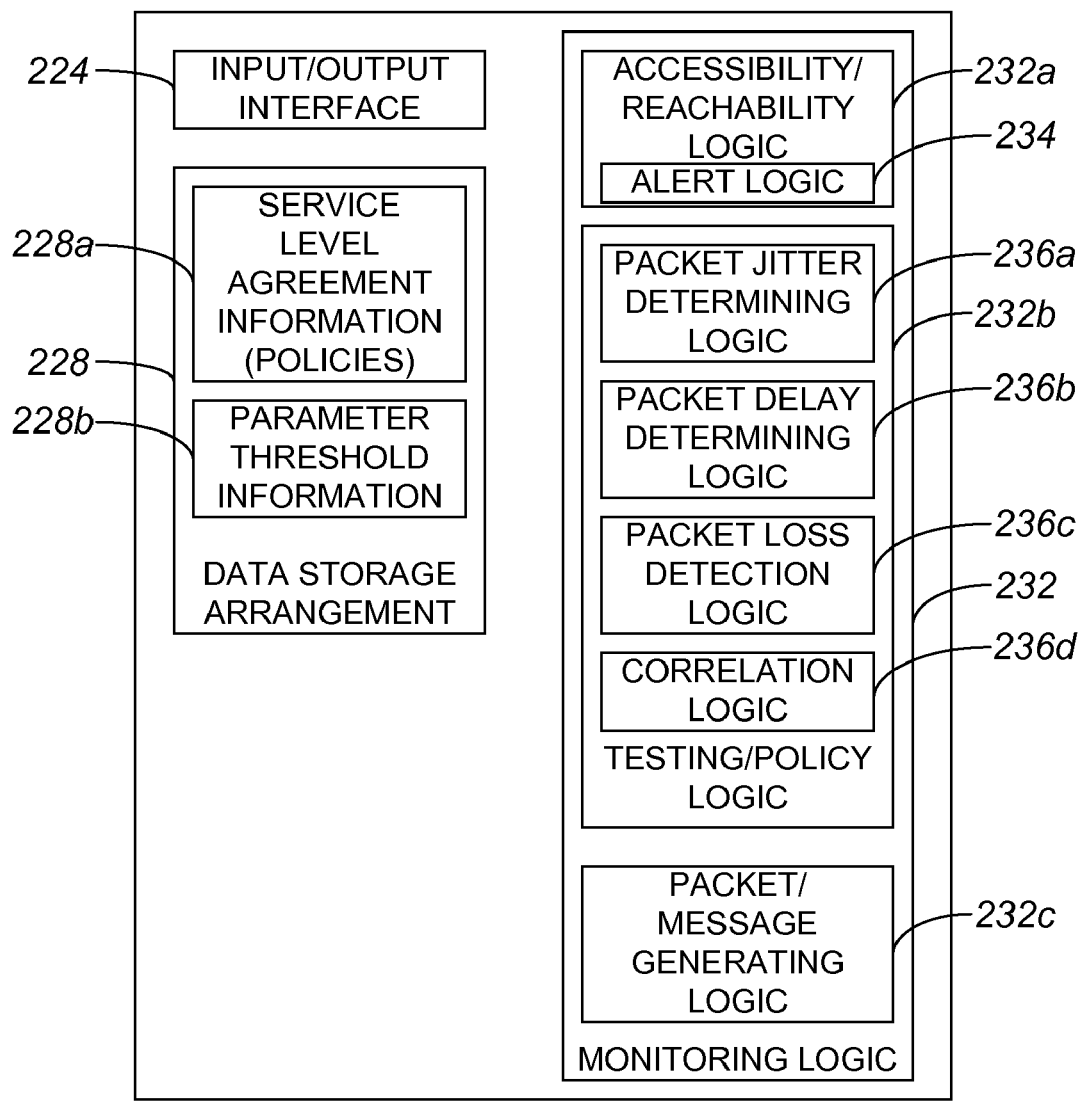
FIG. 2 is a block diagram representation of a network element which is capable of monitoring parameters associated with the reachability of elements, applications, or services and sending notifications to subscribers in accordance with an embodiment of the present invention.

A network element that aggregates subscriber traffic, monitors parameters to determine the accessibility or reachability of elements, applications, or services, and sends notifications to subscribers will be described with respect to FIG. 2 in accordance with an embodiment of the present invention. A network element 208 may be device such as a BGP gateway, a router, or an application server. Network element 208 generally includes an input/output interface 224 that sends information to and receives information from an overall network, as for example from subscribers and from the Internet.

Typically, network element 208 monitors parameters associated with elements, applications, and/or services associated with a network such as the Internet. Using the parameters, network element 208 may determine the accessibility or reachability of the elements, applications, and/or services. In other words, network element 208 is arranged to determine the accessibility or reachability of resources. By way of example, parameters may be assessed to determine the Internet Protocol (IP) reachability of a BGP next hop, the IP reachability of a website on the Internet, the IP reachability of an AAA server. Parameters may also be assessed to determine whether a service level agreement (SLA) is likely to be met. Parameters that are monitored by network element 208 may be those that are specified between two points in an overall network, and may be specified in a SLA between a subscriber and a service provider. In general, parameters may include, but are not limited, to a packet loss percentage, a packet delay, and a packet jitter.

Network element 208 includes monitoring logic 232 that allows parameters associated with the Internet service to be monitored. Herein, although parameters will be described in terms of parameters that are associated with services for ease of discussion, it should be appreciated that parameters may instead be associated with elements and applications. Generally, parameters may include device or network path states, and may be associated with substantially any resource to which access may be desired. Monitoring logic 232, which may include hardware logic and/or software logic embodied in a tangible media, includes accessibility/reachability logic 232a, testing/policy logic 232b, and packet/message generating logic 232c. Accessibility/reachability logic 232a is arranged to assess whether a particular service is accessible, and includes alert logic 234 that causes an alert or notification regarding a lack of accessibility or reachability to be sent to a subscriber, e.g., via input/output interface 224.

Testing/policy logic 232b includes logic that determines parameters associated with services. In the described embodiment, testing/policy logic 232b includes logic 236a that determines packet jitter associated with services, logic 236b that determines packet delay, and logic 236c that detects packet loss. Correlation logic 236d is arranged to determine a correlation between a subscriber and a service parameter events that affect the subscriber. An internet service may generally be modeled to consider the reachability of a given network route, and a delay in reaching a network element. A monitoring policy is typically constructed so that when either the reachability of the delay substantially exceed allowed thresholds, a service disruption alert is raised. Such a service disruption alert or service parameter event may trigger the service notification mechanism into action.

Packet/message generating logic 232c is arranged to send packet probes or, in one embodiment, null AAA messages via input/output interface 224 to assess parameters and to determine accessibility or reachability. For example, packet probes may be sent to assess packet jitter, packet delay, and packet loss.

Network element 208 also includes a data storage arrangement 228 such as a database arrangement or a memory arrangement. In lieu of including a database arrangement or a memory arrangement, however, data storage arrangement 228 may instead include a link to an external storage arrangement. Data storage arrangement 228 stores SLA information 228a and parameter threshold information 228b. SLA information 228a may include SLA policies against which parameters may be compared to determine whether an alert is to be sent using alert logic 234. Parameter threshold information 228b typically stores thresholds for parameters such that when parameters are determined, they may be compared to the thresholds to determine whether an alert is to be sent using alert logic 234. By way of example, parameter threshold information 228b may include a maximum packet loss percentage that may be allowed before a service is considered to be inaccessible or unreachable.

Figure 3:
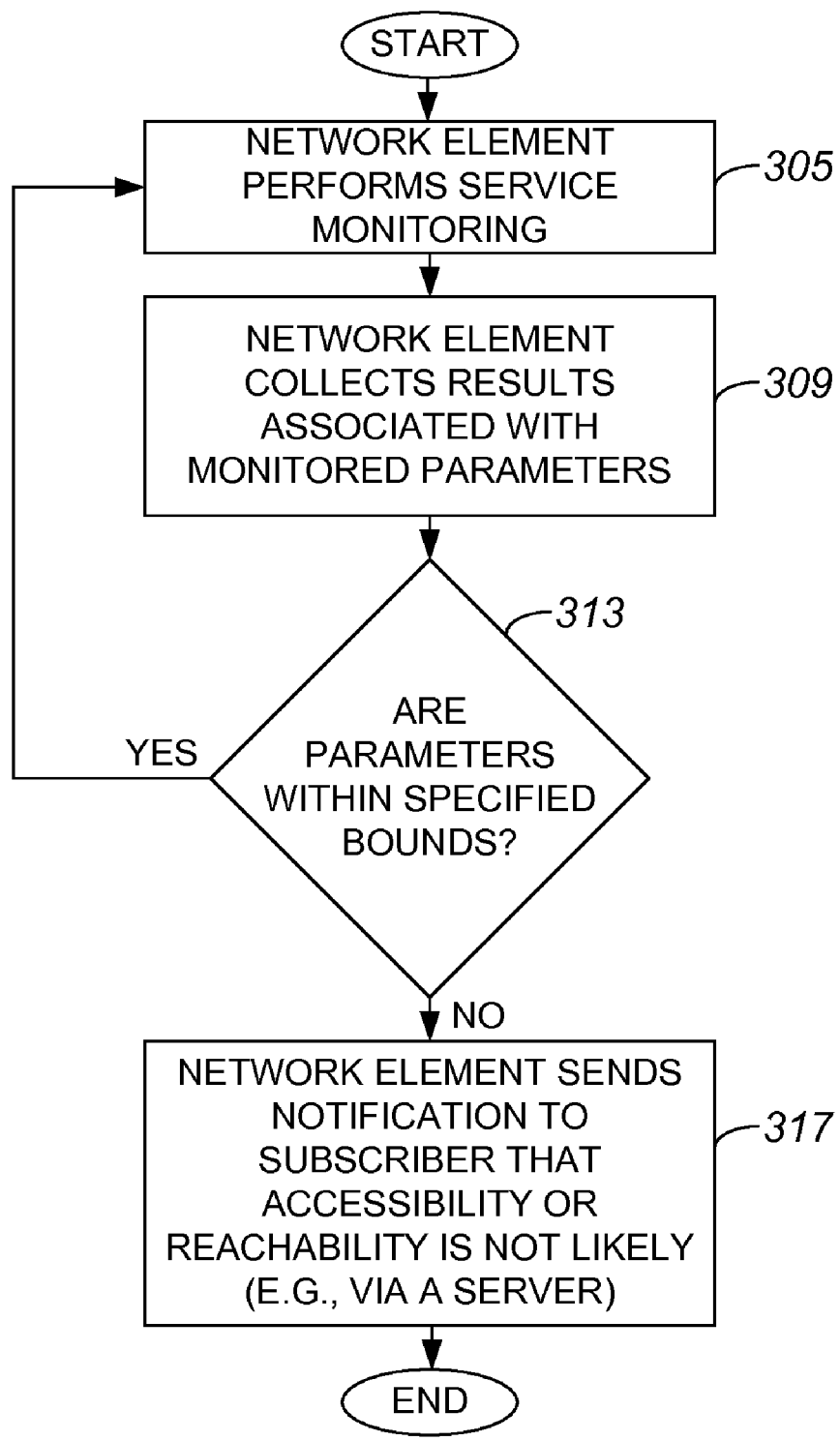
FIG. 3 is a process flow diagram which illustrates one method of operating a network element which is capable of monitoring reachability and sending notifications regarding reachability in accordance with an embodiment of the present invention.

Referring next to FIG. 3, one method of operating a network element which is capable of monitoring accessibility or reachability, and sending notifications regarding accessibility or reachability, will be described in accordance with an embodiment of the present invention. A process 301 of operating a network element begins at step 305 in which the network element performs service monitoring. Service monitoring may include sending probe packets to specified destinations, e.g., destinations specified by IP addresses, and ascertaining whether the probe packets were received. In one embodiment, the network element may monitor a given network location, e.g., an IP subnet, by checking router-peer announcements to determine if the network location is reachable.

Generally, the network element may perform service monitoring by taking measurements of parameters, e.g., monitored parameters, that have been identified as being substantially needed for the successful delivery of a particular service. Such parameters may include, but are not limited to including, the network reachability of a given IP address such as the address of a BGP next-hop, the network reachability of a given IP sub-net, the network reachability of a network resource that is substantially linked to the particular service, and network performance parameters such as packet delay parameters. As will be appreciated by those skilled in the art, parameters may be collected through the use of a method such as active packet probing.

After service parameter monitoring is performed, the network element collects results associated with monitored parameters in step 308. In one embodiment, the network element may use the parameters to effectively ascertain whether a target is accessible or reachable. A target may include, but is not limited to including, a next hop, a website, a server, a service, or network topology information that is conveyed in routing protocols. One process of ascertaining the likely accessibility or reachability will be discussed below with respect to FIG. 4B. Typically, ascertaining the likely accessibility or reachability of a target may include comparing parameters determined during service monitoring against thresholds.

Once the network element collects results associated with monitored parameters, the network element determines in step 313 whether the parameters are within specified bounds. In one embodiment, it is determined in step 313 if a service level agreement may be met. If it is determined that the parameters are within specified bounds, the indication is that accessibility or reachability of a target is likely, and process flow returns to step 305 in which the network element performs service monitoring. Alternatively, if it is determined that the parameters obtained during service monitoring do not meet minimum thresholds, e.g., do not meet a particular SLA, the indication is that accessibility or reachability of a target is unlikely. Accordingly, in step 317, the network element sends a notification or an alert to the subscriber which indicates that accessibility or reachability is unlikely or substantially impossible. Sending the notification or alert may involve, in one embodiment, redirecting some application traffic, e.g., HTTP traffic, to an application server that may then send the actual notification or alert. In other words, the network element may invoke a notification mechanism associated with either an embedded or standalone application server that allows a notification to be sent. After the notification is sent, the process of operating a network element is completed.

Figure 4A:
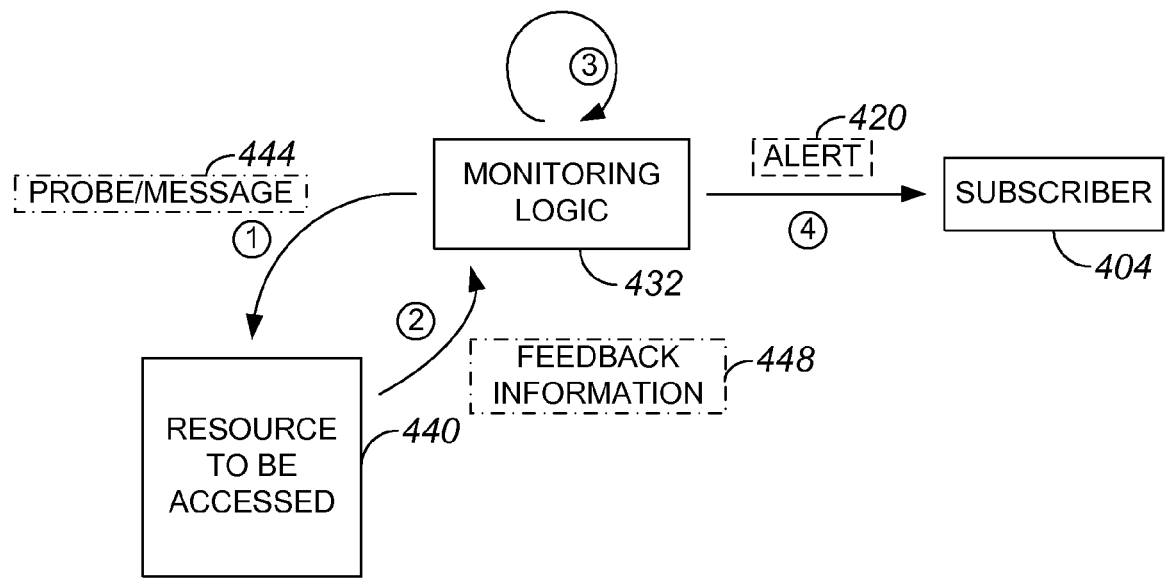
FIG. 4A is a block diagram representation of a process of monitoring reachability and sending a notification accordingly in accordance with an embodiment of the present invention.

A determination of whether the accessibility or reachability of a particular resource may be compromised is generally accomplished using monitoring logic within a network element. FIG. 4A is a block diagram representation of a process of monitoring accessibility or reachability, and sending a notification accordingly, in accordance with an embodiment of the present invention. Monitoring logic 432, which may include software and/or hardware code devices embodied in a tangible medium, is generally arranged to communicate with a resource to be accessed 440, e.g., a resource that a subscriber 404 either has reached or is likely to attempt to reach. It should be appreciated that resource 440 may generally be a resource such as a device, a service, or an application. Monitoring logic 432 may initiate a probe packet or a message 444, and cause probe packet or message 444 to be transmitted to resource 440.

Resource 440 may provide feedback information 448 to monitoring logic 432. Feedback information 448 may include information relating to the receipt of probe packet or message 444. Feedback information 448 will be discussed below with respect to FIG. 4B. In one embodiment, if probe packet or message 444 fails to be received or otherwise obtained by resource 440, feedback information 448 may effectively be provided when substantially no information is provided to monitoring logic 432 by element 440. Feedback information 448 may generally include information that is obtained from element 440 through passive monitoring, as for example monitoring of the continued presence of an IP route or sub-net, or a BGP next hop, in a routing table (not shown).

Monitoring logic 432 may cause feedback information 448 to be processed to determine whether subscriber 404 is to be alerted that accessibility or reachability of resource 440 is unlikely. In other words, monitoring logic 432 causes a determination to be made regarding whether resource 440 is likely to be accessed or reached by subscriber 404. If resource 440 is determined to be unlikely to be accessed or reached by subscriber 404, monitoring logic 432 may cause alert 420 to be transmitted by an application server to subscriber 404 to notify subscriber 404 that resource 440 is unlikely to be accessed or reached.

Figure 4B:
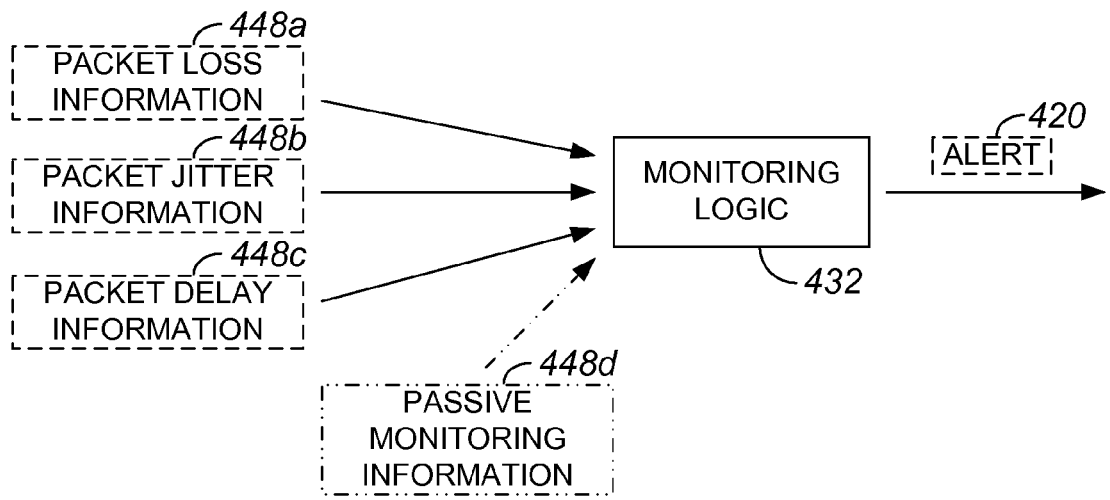
FIG. 4B is a block diagram representation of information obtained from an element to be accessed that is used to determine whether a notification is to be sent in accordance with an embodiment of the present invention.

FIG. 4B is a block diagram representation of feedback information 448 obtained from resource 440 that is used to determine whether a notification is to be sent in accordance with an embodiment of the present invention. Feedback information 448 may generally include substantially any information that may be used to ascertain the accessibility or reachability of element 440 of FIG. 4A. That is, feedback information 448 such as information 448a relating to packet loss, information 448b relating to packet jitter, and information 448c relating to packet delay may be used by monitoring logic 432 to essentially analyze whether resource 440 of FIG. 4A is likely accessible or reachable. Based on the analysis of feedback information 448, alert 420 regarding accessibility or reachability may be sent, e.g., to subscriber 404 of FIG. 4A. In general, other information may be included in feedback information, i.e., feedback information 448 is not limited to information 448a-c. For example, feedback information 448 may include passive monitoring information 448d obtained through substantially passive monitoring of the presence of an IP router or subnet. Information 448a-c may effectively be determined based on the receipt of packets or messages including probe packet or message 444 of FIG. 4A.

Monitoring logic 432 may identify the parameters and, further, the subscribers which information 448a-c is relevant to. Then, using information 448a-c, monitoring logic 432 may ascertain whether particular service parameter events that affect subscriber 404 have occurred. Correlating subscribers with service parameter events that affect the subscribers enables the subscribers to be notified in an efficient manner once service parameter events occur. To achieve the ability to correlate subscribers with service parameter events, a SLA monitoring policy may be incorporated into a control policy associated with the sessions of each subscriber. The control policy may be triggered by an event in the SLA monitoring policy such that a notification is sent to the subscriber.

In one embodiment, a list of subscribers that would be affected by a particular service parameter event may be maintained such that when the particular service parameter event occurs, each subscriber in the list is notified, as for example automatically, of the occurrence. Such a list may be updated periodically, as for example when a new subscriber is added to an overall network, or may be created in real-time when an event occurs. It should be appreciated that a list may be created for each event that may occur within a service group. For example, each service policy may be linked with a policy for service group events such that each service may be associated with a service group.

Figure 5:
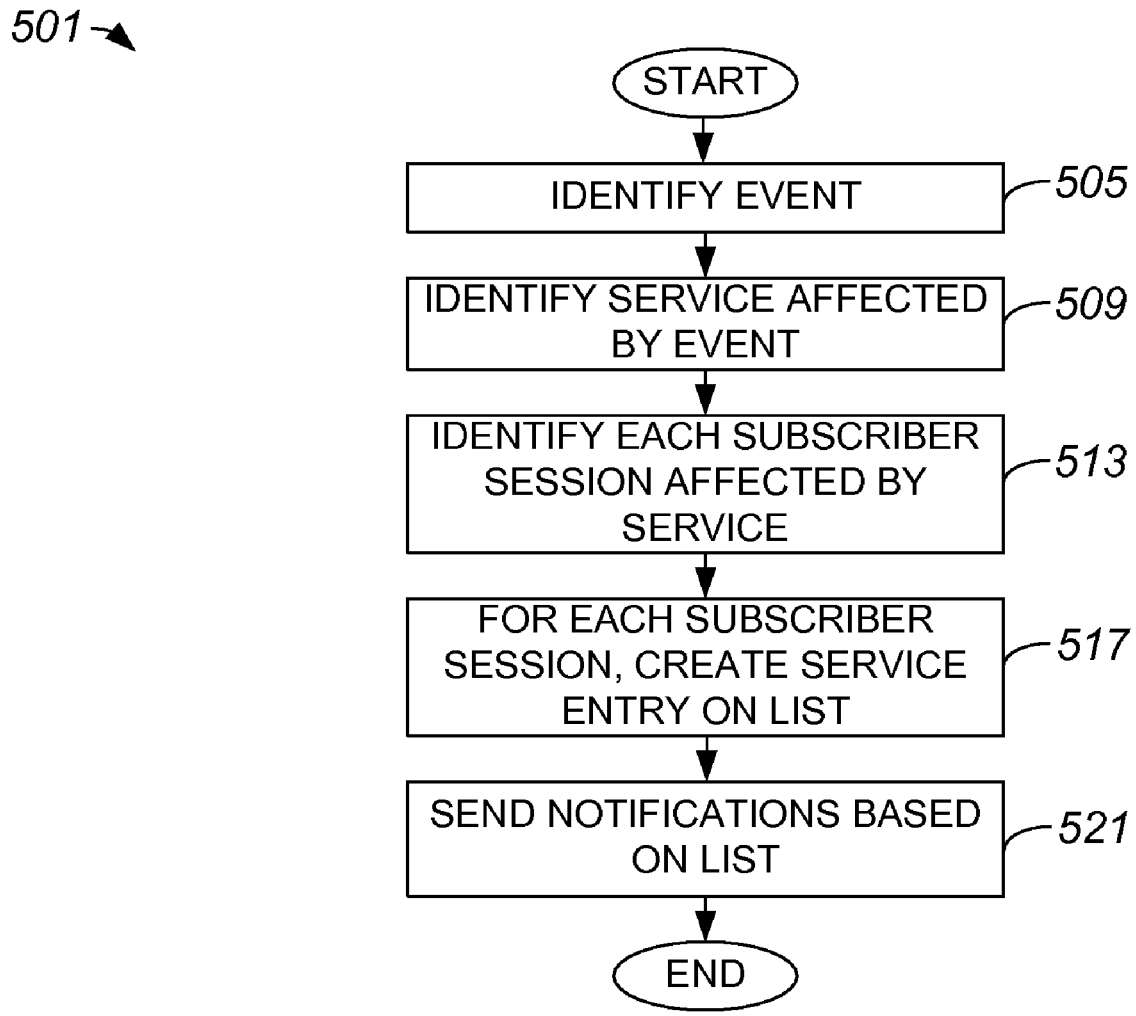
FIG. 5 is a process flow diagram which illustrates a method of creating a list of subscribers to which notifications are to be sent regarding a particular event in accordance with an embodiment of the present invention.

With reference to FIG. 5, the creation and use of a list of subscribers that are likely to be affected by a particular event will be described in accordance with an embodiment of the present invention. A process 501 of creating and using a list of subscribers begins at step 505 in which an event is identified. Identifying an event may involve either identifying an event that has occurred, or identifying a potential event. The event may affect any number of services. In step 509, a service that is affected by the event is identified. After the service that is affected by the event is identified, each subscriber session that is affected by the service is identified in step 513. Identifying subscriber sessions generally involves identifying subscribers that are affected. For each subscriber session, a service entry is created on a list, i.e., the list of subscribers that are likely to be affected by the event, in step 517. The service entry may generally identify the service affected by the event, as well as the subscriber session that is affected. Once service entries are created on the list for each subscriber session, notifications may be sent based on the list in step 521, and the process of creating and using a list of subscribers is completed.

Although only a few embodiments of the present invention have been described, it should be understood that the present invention may be embodied in many other specific forms without departing from the spirit or the scope of the present invention. By way of example, the functionality associated with a network element such as element 208 of FIG. 2 may vary. In one embodiment, rather than sending a notification or alert to a subscriber regarding reachability, a network element may effectively trigger an external notification to a network monitoring system (NMS) system that alerts an operator about a fault that may affect the subscriber. That is, notification may be provided to a network operator rather than to the subscriber. The operator may then notify the subscriber.

The term "service" may generally refer to network connectivity services, and may also refer to applications. It should be appreciated that if a service refers to network connectivity, the service is the communication sought by a subscriber. Hence, for a connectivity service, an apparatus of the present invention may provide the service and monitor the service. For an application service, an apparatus of the present invention may generally monitor the application service.

Parameters have generally been described as being compared to thresholds to determine the accessibility or reachability of a resource. Comparing parameters to thresholds may involve comparing a parameter to a predetermined range to determine whether the parameter falls within the range. If the parameter falls within the range, a resource may be considered to be accessible. On the other hand, if the parameter falls outside the predetermined range, the resource may be considered to be inaccessible.

In addition to notifying subscribers of a reachability issue, a network element such as a gateway or a router may populate a web portal page, e.g., using an XML push, to which subscribers may be redirected. Such a web portal page may be arranged to include information regarding a service outage that is obtained through the router populating the web portal page.

Service monitoring may continue with regards to a service even after a subscriber has been notified that the service is inaccessible. In other words, service monitoring may be used to determine when a service once again becomes accessible. For instance, if continued service monitoring ascertains that a SLA for a subscriber relative to the service is once again met, the continued service monitoring may cause a notification to be sent to the subscriber that indicates that the service is accessible.

The present invention has generally been described in terms of determining the reachability associated with an Internet access service or a business services that are part of a SLA. It should be understood, however, that the monitoring of parameters and the sending of notifications regarding reachability is not limited to use with respect to Internet access services and business services that are part of a SLA.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
    identifying at least one parameter as being associated with a service arranged to be provided to an entity, wherein the service is arranged to service the entity;
    monitoring the at least one parameter using a network element included in a network, wherein monitoring the at least one parameter includes monitoring the at least one parameter to determine if accessibility to the service by the entity is compromised; and
    invoking a notification mechanism to send a notification from the network element through the network to the entity if it is determined that the accessibility to the service by the entity is compromised, the notification being arranged to indicate that the accessibility to the service is compromised.

2. The method of claim 1 wherein monitoring the at least one parameter to determine if accessibility to the service by the entity is compromised includes comparing the at least one parameter against a threshold value.

3. The method of claim 2 wherein monitoring the at least one parameter to determine if accessibility to the service by the entity is compromised further includes comparing the at least one parameter against a service level agreement (SLA).

4. A method comprising:
    identifying at least one parameter as being associated with a service arranged to be provided to an entity, wherein the service is arranged to service the entity;
    monitoring the at least one parameter, wherein monitoring the at least one parameter includes monitoring the at least one parameter to determine if accessibility to the service by the entity is compromised; and invoking a notification mechanism to send a notification to the entity if it is determined that the accessibility to the service by the entity is compromised, the notification being arranged to indicate that the accessibility to the service is compromised, wherein monitoring the at least one parameter includes sending a probe to the service, and the at least one parameter is at least one selected from the group including packet loss associated with the service, packet delay associated with the service, packet jitter associated with the service, and internet protocol (IP) reachability associated with the service.

5. The method of claim 1 wherein monitoring the at least one parameter to determine if accessibility to the service by the entity is compromised includes receiving feedback information from the service and utilizing at least the feedback information to determine whether the notification is to be generated.

6. The method of claim 1 wherein the service is associated with a resource that is one selected from the group including a border gateway protocol (BGP) next hop, a routing protocol adjacency, an internet resource, a network application server, and a network routing prefix.

7. Logic encoded in one or more non-transitory computer-readable tangible media for execution and when executed operable to:
identify at least one parameter as being associated with a service arranged to be provided to an entity, wherein the service is arranged to service the entity;
monitor the at least one parameter, wherein the logic operable to monitor the at least one parameter is further operable to monitor the at least one parameter to determine if accessibility to the service by the entity is compromised; and
invoke a notification mechanism to send a notification to the entity if it is determined that the accessibility to the service by the entity is compromised, the notification being arranged to indicate that the accessibility to the service is compromised.

8. The logic of claim 7 wherein the logic operable to monitor the at least one parameter to determine if accessibility to the service by the entity is compromised includes logic operable to compare the at least one parameter against a threshold value.

9. The logic of claim 8 wherein the logic operable to monitor the at least one parameter to determine if accessibility to the service by the entity is compromised is further operable to compare the at least one parameter against a service level agreement (SLA).

10. The logic of claim 7 where the logic operable to monitor the at least one parameter is further operable to send a probe to the service, and the at least one parameter is at least one selected from the group including packet loss associated with the service, packet delay associated with the service, packet jitter associated with the service, and internet protocol (IP) reachability associated with the service.

11. The logic of claim 7 wherein the logic operable to monitor the at least one parameter to determine if accessibility to the service by the entity is compromised is further operable to receive feedback information from the service and still further operable to utilize the feedback information to determine whether the notification is to be generated.

12. The logic of claim 7 wherein the service is associated with a resource that is one selected from the group including a border gateway protocol (BGP) next hop, a routing protocol adjacency, an internet resource, a network application server, and a network routing prefix.

13. An apparatus comprising:
means for identifying at least one parameter as being associated with a service arranged to be provided to an entity, wherein the service is arranged to service the entity;
means for monitoring the at least one parameter, wherein the means for monitoring the at least one parameter include means for monitoring the at least one parameter to determine if accessibility to the service by the entity is compromised; and
means for invoking a notification mechanism to send a notification to the entity if it is determined that the accessibility to the service by the entity is compromised, the notification being arranged to indicate that the accessibility to the service is compromised.

14. An apparatus comprising:
an interface, the interface being arranged to allow the apparatus to communicate with a subscriber and to communicate with or utilize a service, wherein the subscriber is arranged to communicate with or utilize the service through the apparatus;
a data store, the data store being arranged to store a policy for the subscriber; and
monitoring logic, the monitoring logic being arranged to observe the service to assess accessibility of the service, wherein the monitoring logic is further arranged to determine if the accessibility of the service is consistent with the policy and to cause an alert to be sent to the subscriber if the accessibility of the service is not consistent with the policy.

15. The apparatus of claim 14 wherein the apparatus is one selected from a group including a routing gateway and a border gateway protocol (BGP) gateway.

16. The apparatus of claim 14 wherein the monitoring logic includes probe generating logic that is arranged to cause a probe to be sent to the service using the interface, and wherein the monitoring logic further includes policy logic that is arranged to determine if the accessibility of the service is consistent with the policy by observing at least one parameter associated with the service after causing the probe to be sent to the service and comparing the at least one parameter to at least one threshold value associated with the policy.

17. The apparatus of claim 16 wherein the at least one parameter is at least one selected from the group including packet loss associated with the service, packet delay associated with the service, packet jitter associated with the service, and internet protocol (IP) reachability associated with the service.

18. The apparatus of claim 17 wherein the monitoring logic includes accessibility logic arranged to create the alert and to cause the alert to be sent if the at least one parameter does not compare favorably to the at least one threshold value.

19. The apparatus of claim 14 wherein the service is one selected from the group including a border gateway protocol (BGP) next hop, an internet service, a service, and an authentication, authorization, and accounting (AAA) protocol server.

20. The apparatus of claim 14 wherein the monitoring logic includes first logic arranged to generate a probe to be sent to the service, second logic arranged to assess the policy with respect to the service, and third logic arranged to cause the alert to be sent.

21. The apparatus of claim 14 wherein the monitoring logic is arranged to cause an alert to be sent to the subscriber by redirecting HTTP traffic to a notification mechanism that is arranged to process the HTTP traffic and to send the alert.

* * * * *